(12) United States Patent
Treat et al.

(10) Patent No.: US 10,298,585 B1
(45) Date of Patent: May 21, 2019

(54) BLOCKCHAIN INTEROPERABILITY

(71) Applicant: Accenture Global Solutions Limited, Dublin (IE)

(72) Inventors: David Treat, Ridgefield, CT (US); Giuseppe Giordano, Juan-les-Pins (FR); Luca Schiatti, Juan-les-Pins (FR); Aspyn Cole Palatnick, Long Beach, NY (US); Zixuan Zhang, Philadelphia, PA (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/255,167

(22) Filed: Jan. 23, 2019

Related U.S. Application Data

(60) Provisional application No. 62/622,371, filed on Jan. 26, 2018, provisional application No. 62/769,343, filed on Nov. 19, 2018.

(51) Int. Cl.
*G06F 7/04* (2006.01)
*H04L 29/06* (2006.01)
*H04L 9/06* (2006.01)

(52) U.S. Cl.
CPC .......... *H04L 63/10* (2013.01); *H04L 9/0643* (2013.01); *H04L 63/08* (2013.01); *H04L 2209/38* (2013.01)

(58) Field of Classification Search
CPC ....... H04L 63/08; H04L 63/10; H04L 9/0643; H04L 2209/38
USPC .......................................................... 726/4
See application file for complete search history.

(56) References Cited

U.S. PATENT DOCUMENTS

| | | | |
|---|---|---|---|
| 2017/0048209 A1* | 2/2017 | Lohe | H04L 63/0442 |
| 2017/0083907 A1* | 3/2017 | McDonough | G06Q 20/14 |
| 2017/0221052 A1* | 8/2017 | Sheng | G06Q 20/3678 |
| 2018/0294967 A1* | 10/2018 | Roberts | H04L 9/3236 |
| 2019/0034923 A1* | 1/2019 | Greco | G06Q 20/383 |
| 2019/0043043 A1* | 2/2019 | Saraniecki | G06Q 20/3678 |
| 2019/0080392 A1* | 3/2019 | Youb | G06F 21/64 |

OTHER PUBLICATIONS

Nakamoto, Satoshi, "Bitcoin: A Peer-to-Peer Electronic Cash System" www.bitcoin.com 2008, 9 pages.
Aste, Tomaso et al., "Blockchain Technologies: The Foreseeable Impact on Society and Industry" Computer, Jan. 2017, 11 pages.
(Continued)

*Primary Examiner* — Samson B Lemma
(74) *Attorney, Agent, or Firm* — Brinks Gilson & Lione; Daniel H. Broaddus

(57) ABSTRACT

A system supports asset transfers among blockchains of differing distributed ledger technologies using interop circuitry. The interop circuitry may receive asset permissions from origin and target participant circuitry. The asset permissions may support transfer of an asset from an origin blockchain to a target blockchain. The interop circuitry, acting on behalf of the origin and target participant circuitry, locks an asset on the origin blockchain. Then the interop circuitry creates the asset on the target blockchain. The locking of the asset on the origin blockchain may prevent a double-expend opportunity, where the asset can be redeemed on the origin blockchain and on the target blockchain.

20 Claims, 12 Drawing Sheets

(56) References Cited

OTHER PUBLICATIONS

Tasca, Paolo "Digital Currencies: Principles, Trends, Opportunities, and Risks" Deutsche Bundesbank and ECUREX Research, 110 pages (2017).

Back, Adam et al., "Enabling Blockchain Innovations with Pegged Sidechains", Oct. 22, 2014 (commit 5620e43) 25 pages (2014).

Narayanan, Arvind et al., "Bitcoin and Cryptocurrency Technologies", Draft—Feb. 6, 2016, 308 pages (2016).

Nelson, Jude et al., "Extending Existing Blockchains with Virtualchain", Princeton University, Blockstack Labs, 5 pages (2016).

Kwon, Jae et al. "Cosmos a Network of Distributed Ledgers", 53 pages (2016).

Nelson, Jude et al, "Blockstack Technical Whitepaper", Blockstack, 2017, 24 pages.

Spoke, Matthew, et al., "Aion: The Third-Generation of Blockchain Network", Nuco Engineering Team, Jul. 31, 2017, 23 pages.

Stevens, Marc et al., "The first collision for full SHA-1", CWI Amsterdam, Google Research, 2017, 23 pages.

Trillo, Manny, "The Digital Asset Platform", Non-technical white paper, Digital Asset, Dec. 2016, 29 pages.

Thomas, Stefan et al, "A Protocol for Interledger Payments", 2016, 26 pages.

Wood, Gavin, "Polkadot: Vision for a heterogeneous Multi-Chain Framework Draft 1", Ethereum & Parity, 2016, 21 pages.

Wood, Gavin, "Ethereum: A Secure Decentralised Generalised Transaction Ledger EIP-150 Revision" Ethereum & Ethcore, 2016, 32 pages.

Kwon, Jae, "Tendermint: Consensus without Mining", Draft v.0.6, 2014, 11 pages.

Tasca, Paolo et al., "The evolution of the bitcoin economy: Extracting and analyzing the networks of payment relationships", The Journal of Risk Finance, 2018, 34 pages.

Bitcoin Wiki, 2018 OP_RETURN[Online] Available at hhps://en.bitcoin.it/wiki/OP_RETURn, 1 page.

Ethereum Development Tutorial, Ed. Sep. 17, 2018, 9 pages.

Transaction Formats, Ripple, 2018, [Online] Available at https://ripple.com/build/transactions/.

Welcome to CQRS info, CQRS, [Online] Available at hpps://cqrs.wordpress.com/2010/09/08/welcome-to-cqrs-info/ (2016).

Tasca, Paolo, "Taxonomy of Blockchain Technologies. Principles of Identification and Classification" Centre for Blockchain Technologies, Forthcoming Ledger Journal, 2018, 43 pages.

Back, Adam, "Hashcash—A Denial of Service Counter-Measure", Aug. 1, 2002, 10 pages.

Schwartz, David et al., "The Ripple Protocol Consensus Algorithm", Ripple Labs, 2014, 8 pages.

Mattila, Juri, "The Blockchain Phenomenon. In: The Blockchain Phenomenon", Berkeley Roundtable of the International Economy, 2016, 26 pages.

Todd, Peter, "Soft Forks Are Safer Than Hard Forks", [Online] Available at https://petertodd.org/2016/soft-forks-are-safter-than-hard-forks (2016), 5 pages.

Bitcoin Wiki "Colored Coins", https://en.bitcoin.it/wiki/Colored_Coins, 2018, 7 pages.

Price, Rob, "Digital currency Ethereum is cratering because of a $50 million hack", Business Insider, Jun. 16, 2016, 13 [Online] Available at http://uk.businessinsider.com/dao-hacked-ethereum-crashing-in-value-tens-of-millions-allegedly-stolen-2016-6?IR=T [accessed Dec. 1, 2017], 6 pages.

Croman, Kyle et al., "On Scaling Decentralized Blockchains" (a Position Paper)International Conference on Financial Cryptography and Data Security, Spring, Berlin, Heidelberg, 2016, 20 pages.

Tasca, Paolo et al., "The challenges faced by blockchain—Part 1", Journal of digital Banking 2.2 (2017), 16 pages.

Tasca, Paolo et al., "The challenges faced by blockchain—Part 2", Journal of digital Banking 3 (2018), 17 pages.

Verdian, Gilbert et al., "Quant Overledger Whitepaper" Jan. 31, 2018.

\* cited by examiner

BLOCKCHAIN INTEROPERABILITY

TECHNICAL FIELD

This application claims priority to U.S. Provisional Patent Application Ser. No. 62/622,371, filed 26 Jan. 2018, and titled Blockchain Interoperability. This application also claims priority to U.S. Provisional Patent Application Ser. No. 62/769,343, filed 19 Nov. 2018, and titled Blockchain Interoperability, which is incorporated by reference in its entirety

TECHNICAL FIELD

This disclosure relates to interoperability among distributed ledger technologies.

BACKGROUND

Rapid advances in electronics and communication technologies, driven by immense customer demand, have resulted in newly emerging complex network transaction chains. Improvements in the hardware and software implementations of the underlying processing for the transaction chains will increase the security, reliability, and speed of the implementations.

DETAILED DESCRIPTION

Figure 1:
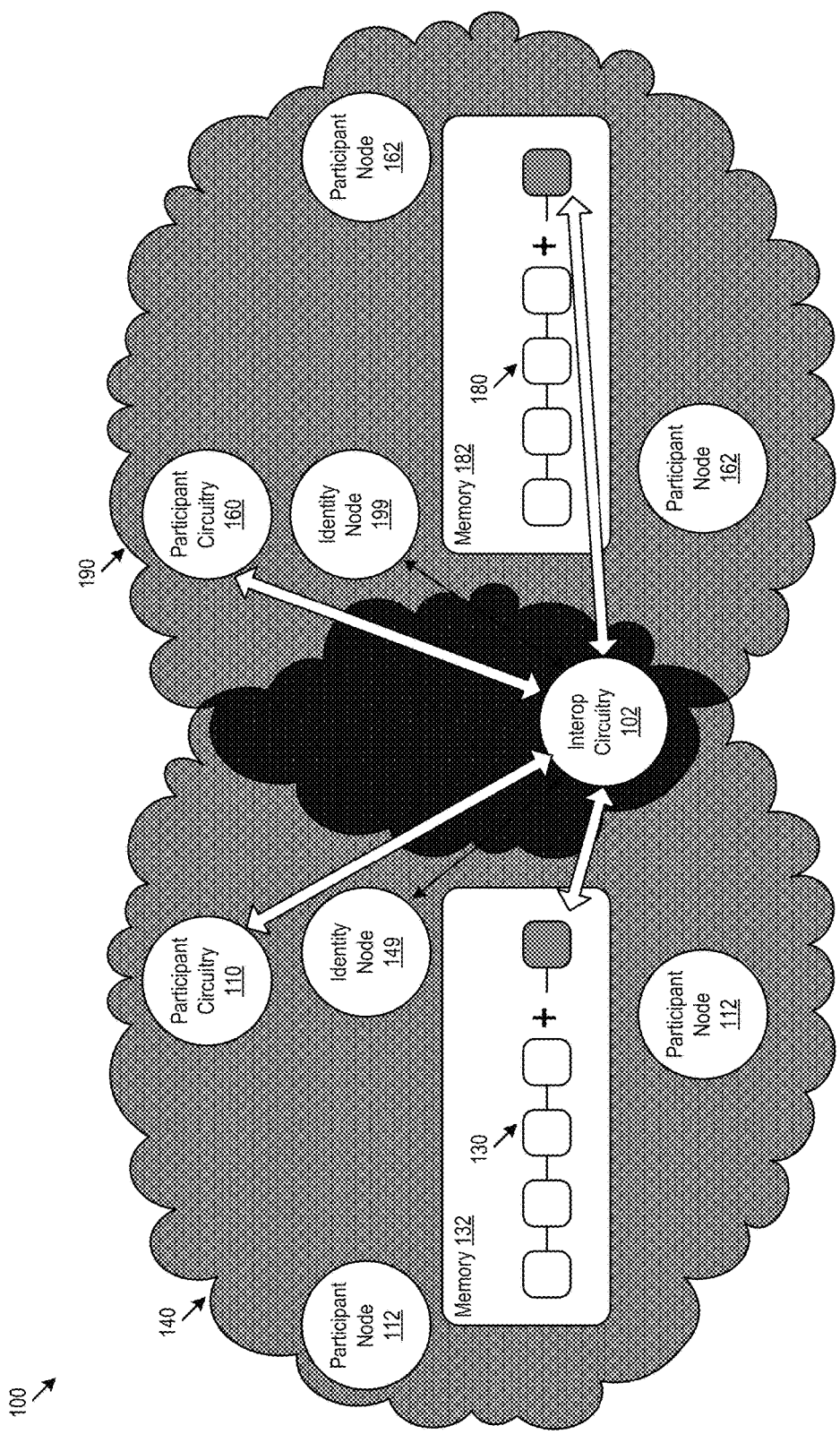
FIG. 1 shows a blockchain interop system interacting with participant circuitry.

In a blockchain, participants, e.g., clients, terminals, or other participating nodes, may append data blocks to a blockchain. Executable code that controls the operation of the blockchain, may implement multiple mechanisms that control append operations to the blockchain to be compliant with one or more distributed ledger technologies (DLTs). A DLT may include a collection of one or more blockchain features that are adopted in the blockchains that are compliant with the DLT. One mechanism may include a hash structure that, for example, may include a self-referential scheme that may help prevent evidence-less tampering with the blockchain content. Additionally or alternatively, executable code may implement a consensus mechanism that may facilitate determination of which blocks and what content may be rightly appended to the blockchain. Additionally or alternatively, the executable code may define the format of blocks (e.g., the size, number, and name of fields; the format of tracked assets; or other formatting parameters) that may be appended to the blockchain. Differing DLTs may differ in one or more operational mechanisms, such as those discussed above or other mechanisms. Accordingly, a block on a first blockchain compliant with a first DLT may not necessarily be appended to a second blockchain compliant with a second DLT. Accordingly, different DLTs may be incompatible because records on a first DLT cannot necessarily be also appended to the second incompatible DLT in the absence of translation.

An asset (e.g., a spendable asset such as coin, a tracked asset such as a shipment, an executable asset such as smart contract, or other asset) may be tracked on the blockchain. When the asset is expended (e.g., delivered, spent, or otherwise expended), the asset may be marked as spent on the blockchain. If a single asset is tracked on multiple blockchains, in some cases, the asset may be double-spent or otherwise expended multiple times (e.g., once on each of the blockchains). When an asset is tracked or partially tracked on multiple blockchains, the blockchains may be coordinated to avoid multiple expend scenarios.

The techniques and architectures discussed herein discuss a blockchain interoperability system in which interop circuitry performs asset transfer and translation between blockchains, including those compliant differing and incompatible DLTs. Further, the interop circuitry coordinates asset tracking among the blockchains. For example, this coordination may ensure that multiple expends of an asset remain disallowed even after the transfer.

Asset transfers, tracking, and transactions on a blockchains occur through the manipulation of cryptologic and/or cryptographic primitives. Interoperation between differing DLTs involves manipulation of specialized cryptologic and/or cryptographic primitives to support the interoperation, which involves the creation of cryptographic primitives for locking, unlocking, and instantiation of the assets on various ones of the interoperating blockchains. Accordingly, the techniques and architectures discussed herein, including but not limited to receiving and using asset and/or write permissions, locking assets, instantiating assets, and/or implementing a multiple tier permission detail a technical solution (implementing interoperability) to a technical problem (non-interoperating blockchains). This technical solution improves the operation of the underlying hardware—previously non-interacting hardware systems provide an efficient platform by which to interact. Furthermore, the aforementioned features provide improvements over existing market solutions by providing a technical solution allowing greater interoperation between blockchain-based hardware systems as compared to existing interoperation techniques.

Figure 2:
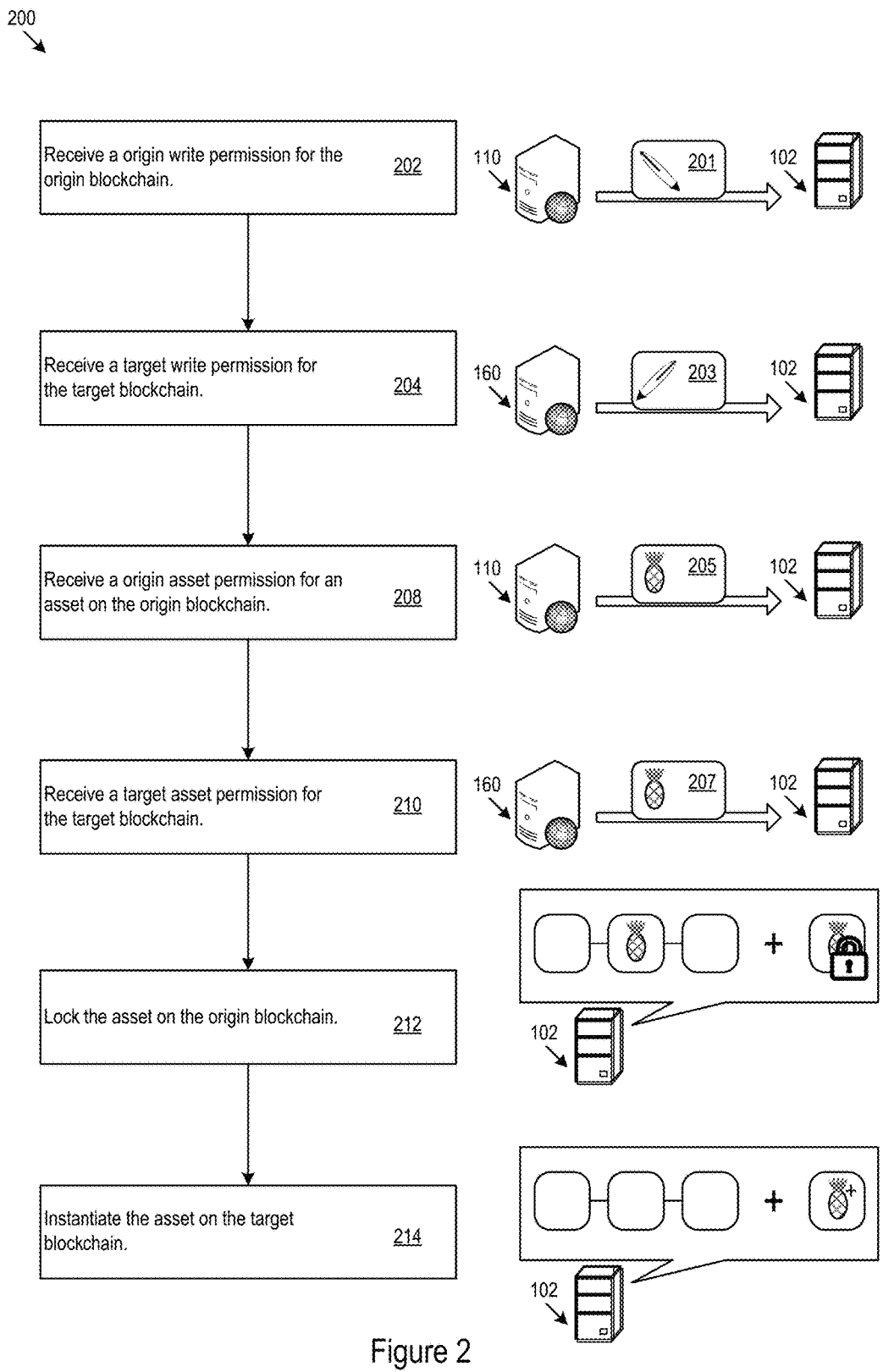
FIG. 2 shows example interop logic.

Referring now to FIGS. 1 and 2, FIG. 1 shows a blockchain interop system 100 interacting with participant circuitry 110, 160 associated with blockchains 130, 180. FIG. 2 shows accompanying interop logic 200 that may control operation of interop circuitry 102 within the interop system 100. Interop circuitry may refer to circuitry, including hardware, that may execute the blockchain interoperability operations discussed herein. In some cases, interop circuitry 102 may act as a participant node within a distributed network 140, 190 operating a blockchain. The interop circuitry 102 may participate as a node in multiple networks 140, 190 concurrently, allowing the interop circuitry to act as an interoperability node for the blockchains corresponding to the networks in which the interop circuitry 102 is a participant. Participant circuitry may refer to participant nodes 112, 162 that interact with the interop circuitry 102 to execute cross-blockchain asset transfers. In some cases, particular blockchains or organizations running one or more blockchains may centralize interop circuitry interaction through designated participant circuitry (e.g., for a single point of contact). In some cases, multiple different nodes/clients from a single blockchain may interact with the interop circuitry. In either of these cases, participant circuitry may interact with the interop circuitry on behalf of other nodes/client within their respective blockchains. The blockchains 130, 180 may be stored on memory 132, 182 which may be distributed and/or redundant. In other words, the blockchain may be at least partially stored on particular memory hardware and the same portions stored on the particular memory hardware may be redundantly stored on other memory hardware. The participant circuitry 110, 160 may be participant nodes for the respective blockchains.

Via the interop system 100, the participant circuitry may exchange read/write permissions and asset permissions as discussed below. In some implementations, the exchange between the participant circuitry may include granting the interop circuitry permissions to act on behalf of the other participant circuitry, e.g., to perform a blockchain write operation and/or transfer an asset between the blockchains. In various scenarios, a participant circuitry may be designated origin participant circuitry 110 and a blockchain designated an origin blockchain 130. Similarly, a participant circuitry may be designated target participant circuitry 160 and a blockchain designated a target blockchain 180. These designations may be transfer specific and may change with different transfers depending on the origin of a particular asset and the target where the asset is headed. In some scenarios, target and origin designates may alternate back and forth as multiple assets are transferred in two-way interoperations between blockchains.

Referring now to FIG. 2, while continuing the reference the example structures in FIG. 1, To perform an asset transfer, the interop circuitry 102 may receive a write permission 201 for the origin blockchain 130 from origin participant circuitry 110 (act 202). For example origin participant circuitry may grant the interop circuitry write permissions for the origin blockchain 130. In some implementations, this may include making an alteration to chaincode, blockchain parameters, blockchain authorized user lists, adding credentials for the interop circuitry to an authorization system, grant access to a private network on which the origin blockchain operates, or other permission grant. In some cases, the origin blockchain may not necessarily implement permission control. Accordingly, in some cases, a write permission grant for the origin blockchain 130 may not necessarily be required for implementation of the interop circuitry. Additionally or alternatively, permission control may be implemented via blockchain components which may be integrated with or separate from the DLT technology. For example, a blockchain may implement permission control via smart contract. In some implementations, permissions may be implemented via a consensus mechanism. In some implementations permissions may be implanted by both smart contract and consensus. For example, permitted node identities may be added or removed by smart contract and procedures and protocols for implementing permission assignments may be integrated into the consensus mechanism.

The interop circuitry 102 may receive a write permission 203 for the target blockchain 180 from target participant circuitry 160 (act 204). For example, target participant circuitry 160 may grant the interop circuitry write permissions for the target blockchain 180. In some implementations, this may include altering chaincode, blockchain parameters, blockchain authorized user lists, adding credentials for the interop circuitry to an authorization system, grant access to a private network on which the origin blockchain operates, or other permission grant. In some cases, the target blockchain may not necessarily implement permission control. Accordingly, in some cases, a write permission grant for the target blockchain 180 may not necessarily be required for implementation of the interop circuitry.

In some implementations, the write permissions may be exchanged (e.g., passed to the interop circuitry, but not necessarily passed all the way through to the opposing origin/target participant circuitry) in an establishment tier of a multiple-tiered permission exchange. This establishment tier may include negotiated permission exchanges to support later, as of yet unplanned asset transfers between the blockchains. In other words, the establishment tier may setup general permissions not specific to any particular asset. For example, the write permission exchange may include operational permissions, such as for example, establishing commands/strings/chaincode for inactivating/locking assets, reactivating/unlocking assets, creating assets to support transfer from other blockchains, and identifiers to support consistent asset tracking across the target/origin blockchains. Thus, a later asset exchange may be implemented using a second transfer tier in which an asset is identified and permissions (e.g., asset permissions) specific to that asset are exchanged.

In some implementations, the establishment tier may further be divided into trust and access subtiers. In the trust subtiers, the participant circuitry may exchange write permissions allowing interaction between the DLTs. In other words, the trust subtier deals with establishing the relationship between the target and origin networks. In the access subtier, the participant circuitry may provide write permissions allowing the interop circuitry to read/write blockchains or otherwise execute transactions on behalf the participant circuitry for the purpose of the exchange. In other words, the access subtier deals with the permissions used by the interop circuitry to perform its role.

In some cases, locking may depend on parallel operation of executable code overlaid on to the blockchain native code. For example, the parallel executable code may act as a wrapper around the blockchain mediating the blockchains external interactions. Thus, locking may be implemented without necessarily altering the native code of the blockchain. Additionally or alternatively, locking status of an asset may be maintained in a central registry (e.g., on the interop circuitry or on an external datastore). For example, the interop circuitry 102 may establish locking status of an asset by making a reference to a status field held by the registry. Thus, the registry may be contacted to obtain the current status of the asset (e.g., locked or unlocked). Further, such operational permissions may be exchanged as write permissions even where the multiple tier exchange is not necessarily implemented. Additionally or alternatively, the operational permissions may be exchanged even where access type write permissions (as described above) are not necessarily exchanged.

Once a specific asset for transfer is selected, the interop circuitry may receive an origin asset permission 205 for the origin blockchain (act 208). As an illustrative example, the asset (a digital cryptologically primitive on the blockchain) may represent fruit shipment (e.g., pineapple) in the real world. The origin asset permission may include permissions to support locking and/or inactivation of the asset on the origin blockchain. This inactivation/locking may prevent a multiple-spend instance for the asset where the asset is spent on the origin blockchain after transfer. The permissions to support this inactivation/locking operation may include permissions to write to particular block fields, for example auxiliary fields, comment fields, protocol reserved fields, or other fields which may not necessarily have designated functions for blockchain operations.

The origin asset permission may also indicate which nodes within the origin network (e.g., that maintains the origin blockchain) should be notified when the transfer is completed. For example, the origin participant circuitry node (e.g., that initiated the transfer from the origin network) may be included on the notification list. In some cases, all nodes on an origin network may be notified. In some cases, identified interested nodes (e.g., a subset of the network's nodes) may be notified. The origin asset permissions may designate these notifications.

In connection with the asset, the interop circuitry may receive a target asset permission 207 for the target blockchain (act 210). The target asset permission may include permissions to allow instantiation of the asset on the target blockchain. For example, the permission may include permission to append a block to the target blockchain or request entries on a block to be appended to the blockchain; prospectively write an asset to the blockchain for later unlocking (e.g., once locking is confirmed on the origin blockchain); permissions to unlock a prospectively written asset; permission to write to particular block fields, for example auxiliary fields, comment fields, protocol reserved fields, or other fields which may not necessarily have designated functions for blockchain operations to coordinate asset tracking and locking control, or other permissions. The target asset permissions may include permissions that are specific to the asset (associated transaction transferring the asset).

Using the origin asset permission 205, the interop circuitry 102 may lock the asset on the origin blockchain (act 212). Locking the asset may involve actions to prevent the asset from being used in later transactions in the blockchain. For example, the interop circuitry may mark the asset with a string or cryptographic primitive that may indicate a locked status—in later blocks these marks may be hashed along with the other content of the block. The interop circuitry may expend the asset to a designated account for transferred assets or an asset specific account to facilitate later tracking of the asset. The interop circuitry 102 may act to ensure that once the asset is transferred from the origin blockchain the asset may not be expended on the origin blockchain. Further, the interop circuitry 102 mark the asset so that it may be tracked to the target blockchain.

Using the target asset permission 207, the interop circuitry 102 may instantiate the asset on the target blockchain (act 214). Instantiation may include actions to create an asset and/or to advance an asset to a state where the asset may be expended on the target blockchain. In some cases, the interop circuitry 102 may wait until the asset is locked on the origin blockchain before creating the asset on the target blockchain. In some cases, the interop circuitry may prospectively create the asset on the target blockchain before the asset may necessarily be locked on the origin blockchain. This may aid in preventing loss of an asset where the asset is locked on one chain, but never fully created on another. After confirming locking on the origin blockchain, the interop circuitry may unlock the prospectively created asset on the target blockchain. The instantiation of an asset may involve writing a string/cryptographic primitive to a blockchain field as discussed above. In some cases, the target asset permission may detail the content of the string/cryptographic primitive as discussed above. In some cases, the included string may identify the origin blockchain to help facilitate tracking across the blockchains.

In some cases, the target asset permission may detail notifications for nodes on the target network 190 (e.g., that maintains the target blockchain). For example, the target participant circuitry node may be notified of transfer completion. Additionally or alternatively, other nodes may be notified similarly to those discussed above with respect to origin network. In some cases, no particular notifications may be sent, but the general distribution of blockchain updates allows any participating node to read block contents and determine that the asset was transfer in/out.

In some implementations, to handle tracking and assignment of the permissions discussed above, the origin 140 and target networks 190 respectively administering the origin and target blockchain may maintain identity or credential nodes 149, 199 that may ensure that participant nodes in the networks operate within their proper roles. Accordingly, the interop circuitry may maintain credentials to substantiate the identity of the interop circuitry with the identity/credential nodes 149, 199. This may help ensure that the interop circuitry has the correct permissions to execute a transfer and may prevent other nodes from attempting to improperly perform such transfers (or other non-permissioned transactions).

Figure 3:
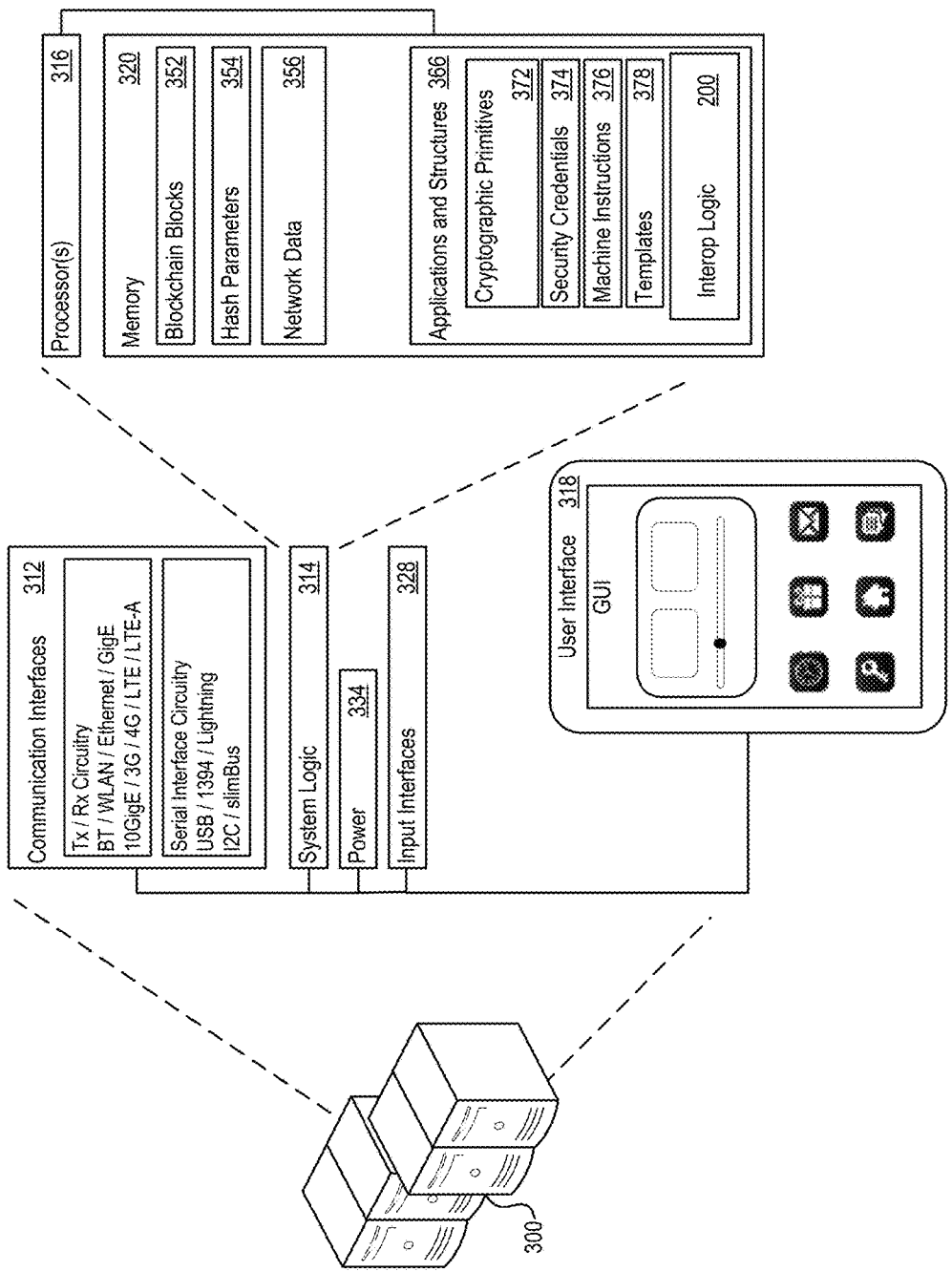
FIG. 3 shows an example specific execution environment for the interop system of FIG. 1.

FIG. 3 shows an example specific execution environment 300 for interop system 100 described above. The execution environment 300 may include system logic 314 to support execution of the interop logic 200 described above. The system logic 314 may include processors 316, memory 320, and/or other circuitry. In various implementations, the specific execution environment 300 may act as the interop circuitry 102 when specifically configured to implement that interop logic 200.

The memory 320 may include blockchain blocks 352, hash parameters 354, and network data 356 to support blockchain manipulation and writing. The memory 320 may further include applications and structures 366, for example, cryptographic primitives, security credentials, machine instructions, templates, or other structures to support permission exchange, asset transfer, transfer notification, blockchain reads/writes or other tasks described above. The applications and structures may implement the interop logic 200.

The execution environment 300 may also include communication interfaces 312, which may support wireless, e.g. Bluetooth, Wi-Fi, WLAN, cellular (4G, LTE/A), and/or wired, Ethernet, Gigabit Ethernet, optical networking protocols. The communication interfaces 312 may also include serial interfaces, such as universal serial bus (USB), serial ATA, IEEE 1394, lighting port, I²C, slimBus, or other serial interfaces. The communication interfaces 312 may be used to support and/or implement permission exchanges, remote operation, blockchain network participation or other tasks. The execution environment 300 may include power functions 334 and various input interfaces 328. The execution environment may also include a user interface 318 that may include human-to-machine interface devices and/or graphical user interfaces (GUI). The user interface 318 may be used to support and/or implement local or localized operation (noting that the blockchain network and/or the execution environment itself may be distributed) of the execution environment 300. In various implementations, the execution environment 300 implemented at the interop circuitry 102 may be distributed over one or more physical servers, be implemented as one or more virtual machines, be implemented in container environments such as Cloud Foundry or Docker, and/or be implemented in Serverless (functions as-a-Service) environments.

In some cases, the execution environment 300 may be a specially defined computational system deployed in a cloud platform. In some cases, the parameters defining the execution environment may be specified in a manifest for cloud deployment. The manifest may be used by an operator to requisition cloud based hardware resources, and then deploy the software components, for example, the applications and structures 366, of the execution environment onto the hardware resources. In some cases, a manifest may be stored as a preference file such as a YAML (yet another mark-up language), JSON, or other preference file type.

The methods, devices, processing, circuitry, and logic described above and in the specific illustrative examples below may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, in hardware, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

In various example implementations, the interop circuitry may be implemented as a Node P and origin/target participant circuitry as Portals in the Portal™ blockchain interoperability solution by Accenture. Various implementations of the Portal™ solution are discussed below. The example Portal™ solution discussed below is included as specific illustrative collection of examples of the architectures and techniques discussed above.

Example Implementations

The example implementations of the interop system 100 described allow for asset transfer between any two blockchains (e.g., Quorum, Hyperledger, or other DLT types). The disclosed architectures and techniques preserve security and consistency features of the involved DLT (e.g., the blockchains subject to the asset transfer).

In some cases, distributed ledger technology (DLT) may be implemented in supply chain tracking because DLT involves keeping track of the sequence of events that occur to an asset as it transitions through the different states. Because these events may occur at different places and may be recorded by different parties, an auditable, transparent, and at least partially immutable database may be used to record these state changes.

As discussed above, different parties involved on the same supply chain may use different DLTs to track assets. To preserve the blockchain consensus, an asset may be locked on its origin DLT before the asset may be initiated on a target DLT. This helps ensure that a single (e.g., not more than one) transferable asset exists at any point in time. In some cases, the example system may allow ownership to change for a non-transferable asset. For example, in some cases, the asset can be transferred, but may remain in a locked state. The locked state conveys that the asset has been transferred to a new DLT and thus any changes made to that locked asset are being performed on an invalid asset.

Thus, an asset that can be safely transferred using Portal™ may be locked. Note that this does not necessarily mean that the smart contract/chaincode has been modified to add the locking feature. As discussed above, a separate wrapper, e.g., chaincode or smart contract, controlling this asset can be used to lock the asset. Alternatively or additionally, this locked status could be controlled from some central registry on the DLT.

As described above, there are a variety of ways of implementing locking for an on-chain asset. As such, a client interface is specified and contains the functions for Portal™ to learn the state of the asset. Table 1 show example function parameters.

TABLE 1

Example Function Parameters

| Function | Parameters | | Returns | |
|---|---|---|---|---|
| | Key | Value | Key | Value |
| createAsset | Info: JSON | | Promise: Resolves to JSON | |
| | origin_asset_id | asset_id on last DLT | success | True if creation is successful, false otherwise |
| | origin_dlt_id | DLT identifier negotiated through Portal(TM) of last DLT | data | Optional extra data |
| | | | asset_id | ID of new asset |
| transferAsset | Info: JSON object | | Promise: Resolves to JSON | |
| | asset_id | ID of asset to lock | success | True if asset is successfully locked, false otherwise |
| | | | data | Optional extra data |
| isLocked | Info: JSON object | | Promise: Resolves to JSON | |
| | asset_id | ID of asset to check lock on | success | True if asset is locked, false otherwise |
| | | | data | Optional extra data |
| query | Info: JSON object | | Promise: Resolves to JSON | |
| | asset_id | ID of asset to return state from | success | True if asset exists, false otherwise |
| | | | origin_asset_id | asset_id on last DLT |
| | | | origin_dlt_id | DLT identifier negotiated through Portal(TM) of last DLT |

As an illustrative example, in Fabric, the system may implement a key-value mapping data structure. Hence, for each new asset created on Fabric, four hashes are generated as keys to store different information about the asset in the mapping. The first key is called the state key and its corresponding value is an array of different states associated with this new asset. The first state of every asset may be "created". If there is an attempt to create an asset that already exists on Fabric (which is determined by looking at the asset ID), the system may generate or throw out an error, may leave the existing asset as is, and may not create a second duplicate asset. Secondly, there is a key that is a SHA256 hash of the asset ID appended with the string "originID". The origin asset ID may be associated with this key. Third, there is another key that is a SHA256 hash of the asset ID appended with the string "lockState". This contains information about if the asset is locked. This may be initialized to be "unlocked" and the other possible value is "locked". Fourth, there is a key that is a SHA256 hash of asset id appended with "dltID". The value associated with this key stores the origin DLT ID where this asset is transferred from.

Upon locking an asset, the chaincode may first check if the asset record already exists and if the asset is already locked. If either of these holds true, the system may generate an error. Otherwise, the chaincode may first change the value associated with the locked state key to "locked" and then append "locked" to the state array associated with this asset ID.

In the example Portal™ system, assets defined in the Portal™ system that exist on a Quorum chain may exist on a single contract. This contract maintains a mapping for each asset to track the current state of each asset.

The mapping maps asset IDs to asset state (a string), and isLocked (a boolean). The mapping also maintains mappings to the original DLT identifier (empty if the asset was originally created on this chain and existed on no prior chain), and the original asset ID (again, empty if the asset was created on this chain and existed on no prior chain). This information allows the previous states of the asset to be traced through to the previous DLTs. When an asset is transferred, the isLocked state is set to true, and the asset should not be accepted by anyone on this DLT anymore.

Figure 4:
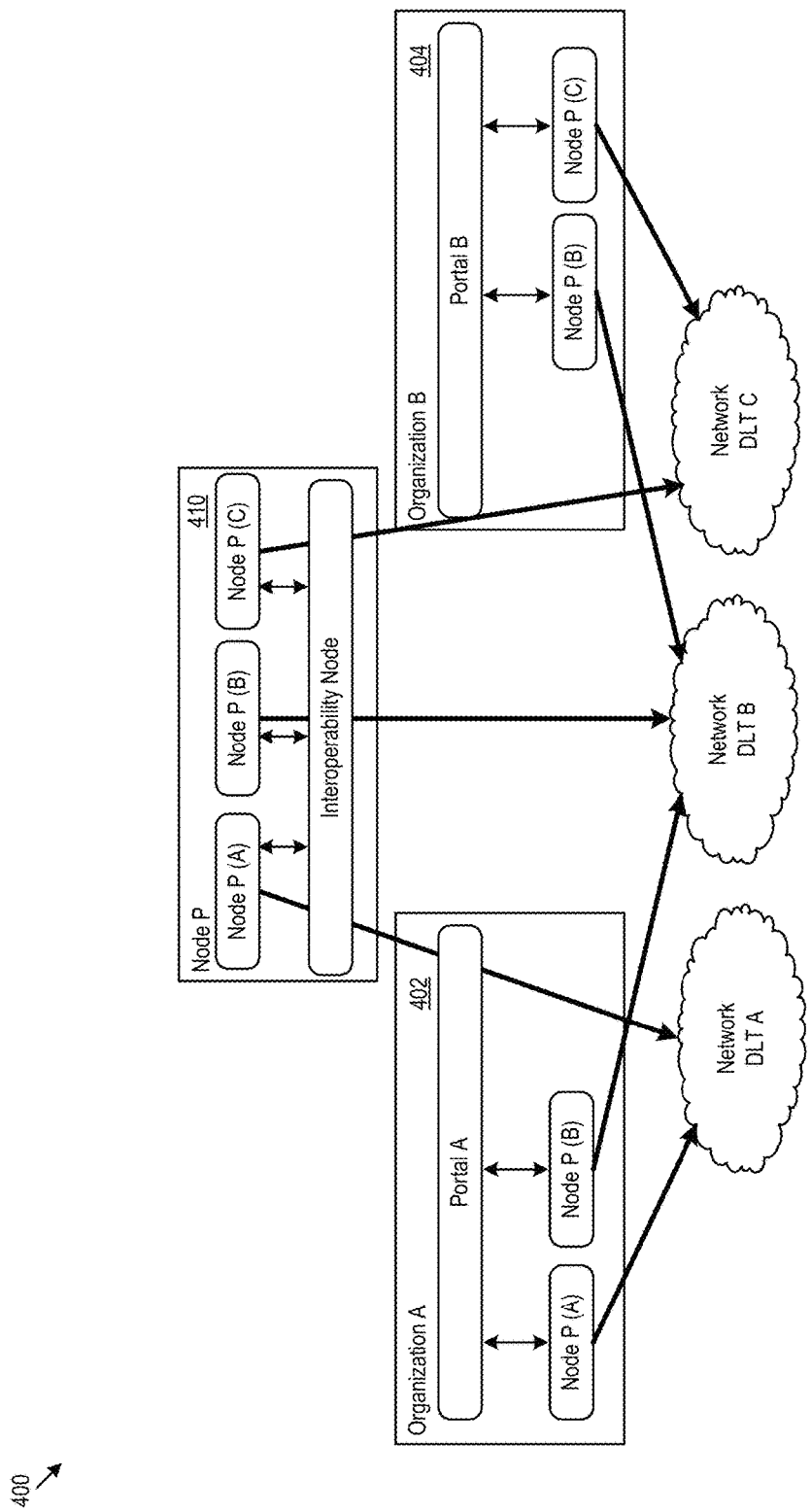
FIG. 4 shows a specific illustrative example blockchain interoperability system.

The asset transfer process relies on a trusted intermediary to facilitate the transfer process. Three parties participate in the process: two Portal™s and one Node P. Each of these parties follows the standard Interoperability Server architecture with some additional features. Through Communication with Node P, the parties (1) Establish baseline agreements about the servers that may be notified of state changes in the asset transfer process (2) Establish baseline agreements on the DLTs that may be used and register the credentials needed for reading/writing to each DLT (3) Initiate and receive updates about the asset transfer process The Interoperability Server that serves as an intermediary in the asset transfer process is labelled Node P. All Portals that wish to perform asset transfers must communicate their intentions and a set of credentials for interacting with their respective DLT(s) to Node P. Thus, the security of the transfer process relies on Node P, and so it is designed to be operated by an entity that is trusted by the organizations which hold Portals for a given exchange. FIG. 4 shows an example blockchain Portal™-based interoperability system 400. The organizations 402, 404 may interact with the Node P 410 via respective portal nodes, e.g., example Portals A and B. For example, organization A 402 may direct its interactions with organization B 404 by routing communications from Portal A to Portal B via Node P (B). Node P (B) has permissions from both organizations A and B 402, 404. Organization A 402 may rout communications to a third organization (not pictured) through Node P (A). Similarly, organization B may route communication to a fourth organization (not pictured) through Node P (C). From the Portals A and B, communications may be routed to individual nodes controlled via the organizations A and B 402, 404.

Node P is the party responsible for holding the agreements and for holding states in the asset transfer process. The Portals are a gateway for interacting with Node P. More specifically, the Portals allow the organizations to send Node P messages asking to establish agreements and to perform asset transfers. Additionally, the Portals receive updates as these agreements are finalized and as each step in the transfer process occurs.

The Interoperability Server that serves as an endpoint of asset transfer communication is labelled Portal. Any organization or collection of organizations acting as a single unit wishing to transfer assets off or onto a DLT may have a single Portal that they use to communicate with Node P. The Portal itself provides a mechanism for organizations to execute their own unique business logic whenever state transitions in the asset transfer process occur as the Portal is notified at each successful step or failure in the asset transfer process.

Figure 5:
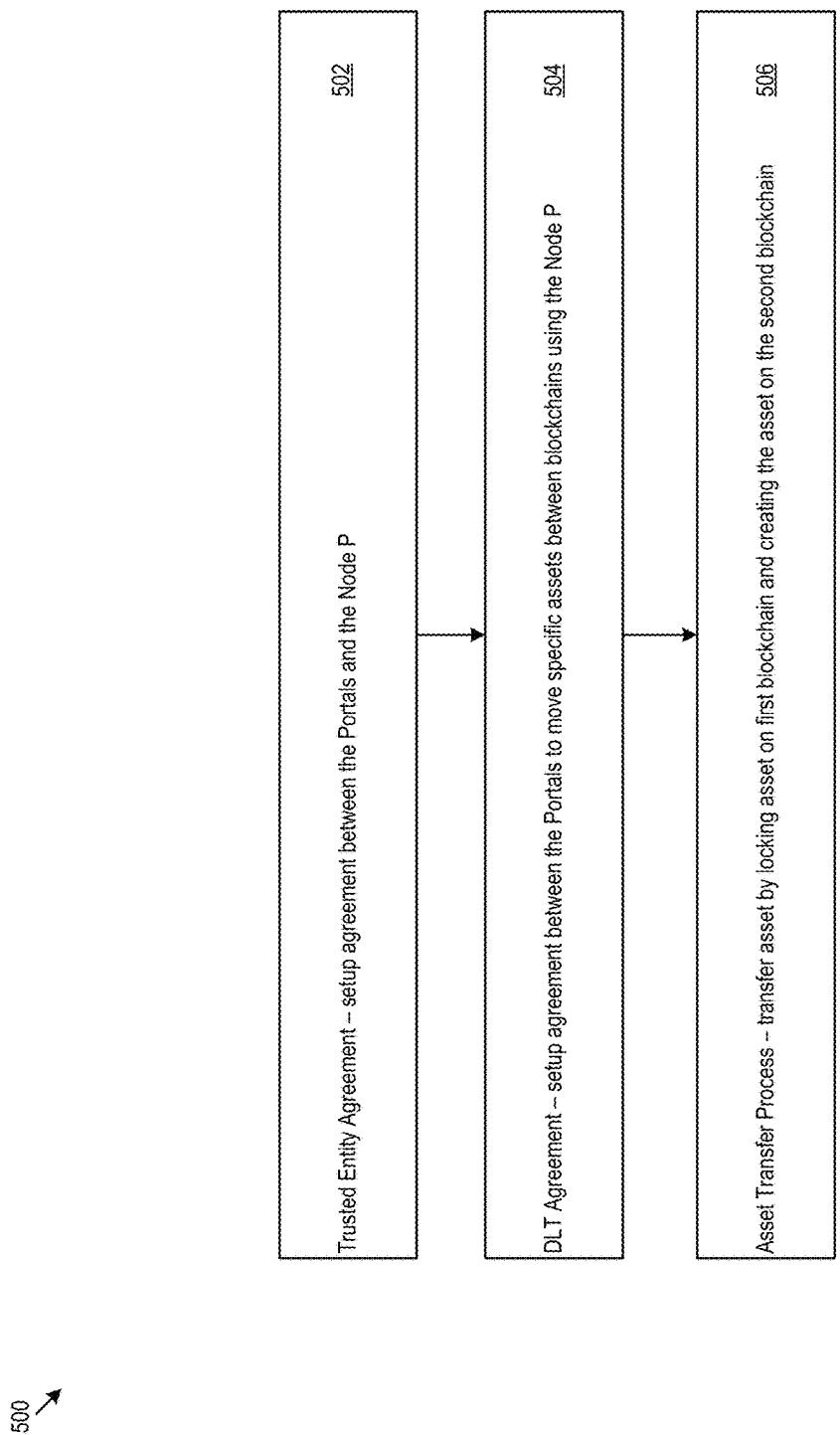
FIG. 5 shows a flow diagram of an example agreement process by which an asset may be transferred.

FIG. 5 shows a flow diagram 500 of an example agreement process that sets up the three agreement types. In some cases, the asset transfer solutions use on three agreements in order for asset transfer to occur. First, two Portals may agree to communicate with one another by establishing common DLT identifiers and to perform asset transfers facilitated by Node P (act 502). Second, two Portals may agree on the respective DLTs for which they would like to involve in asset transfer (act 504). Third, two Portals may agree on the asset to be transferred, which DLT the asset may be transferred from, and which DLT the asset may be transferred to (act 506). The third agreement, once confirmed by both parties, may carry out the asset transfer process on Node P and may periodically notify the involved Portals of state transitions in the asset transfer process and of errors, if errors do occur.

This agreement process may allow for additional communication or trust validation (such as verifying certificates and proofs) to occur between parties before certain agreements are established.

Figure 6:
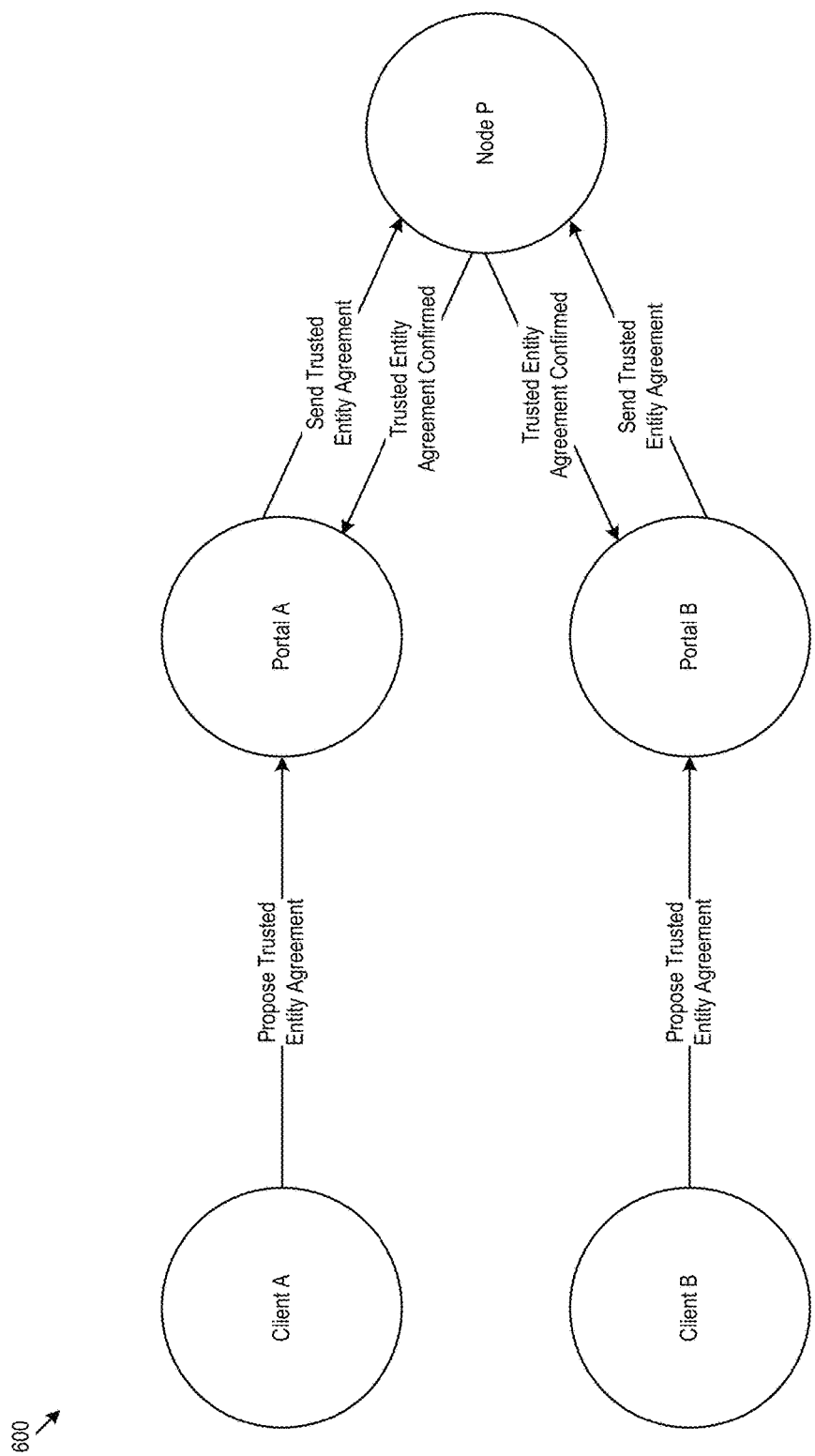
FIG. 6 shows a block diagram showing an example Trusted Entity Agreement exchange.

Two Portals that would like to have the ability to be involved in asset transfers must communicate with Node P that they would like to establish a Trusted Entity Agreement, which is stored on Node P and indicates an agreement for mutual communication between the two Portals involved. The reason this agreement is used is because Node P is responsible for sending messages to parties that are willing to interoperate. FIG. 6 shows a block diagram showing an example Trusted Entity Agreement exchange 600 between to nodes from two different DLTs.

The process for establishing a Trusted Entity Agreement is: the Portals send messages to Node P, and then Node P issues a message to the Portals once the agreement is established. In an example scenario, the two organizations represented by Portal A and Portal B, respectively, and Node P. Since the Portals are used to communicate with Node P, the organizations may employ a way to communicate with their respective Portal. Each organization may have a client that is allowed to send messages to the organization's Portal. For example, Portal A has a client, client A, that is allowed to send requests to Portal A, and Portal B has some client, client B, that is allowed to send requests to Portal B. Now, if Portal A would like to establish a Trusted Entity Agreement with Portal B, the following steps take place:

Client A sends a message to Portal A asking Portal A to establish a Trusted Entity Agreement with Portal B.

Portal A receives the message from client A and sends a message to Node P stating that Portal A would like to establish an interoperability agreement with Portal B. In an example implementation, IP Addresses+Ports are used to uniquely identify Portals for the purpose of this agreement.

Node P receives the message from Portal A and stores the Trusted Entity Agreement between Portal A and Portal B as "unconfirmed".

The above may be repeated with client B and Portal B sending the messages.

Once Node P receives the message from Portal B asking to establish a Trusted Entity Agreement with Portal A, given that the Trusted Entity Agreement between Portal A and Portal B is stored on Node P as "unconfirmed", the state of the Trusted Entity Agreement between Portal A and Portal B that is stored on Node P is updated to be "confirmed". At this point, Portal A and Portal B have successfully established an interoperability agreement.

Node P sends a message to both Portals stating the Trusted Entity Agreement has been established.

Figure 7:
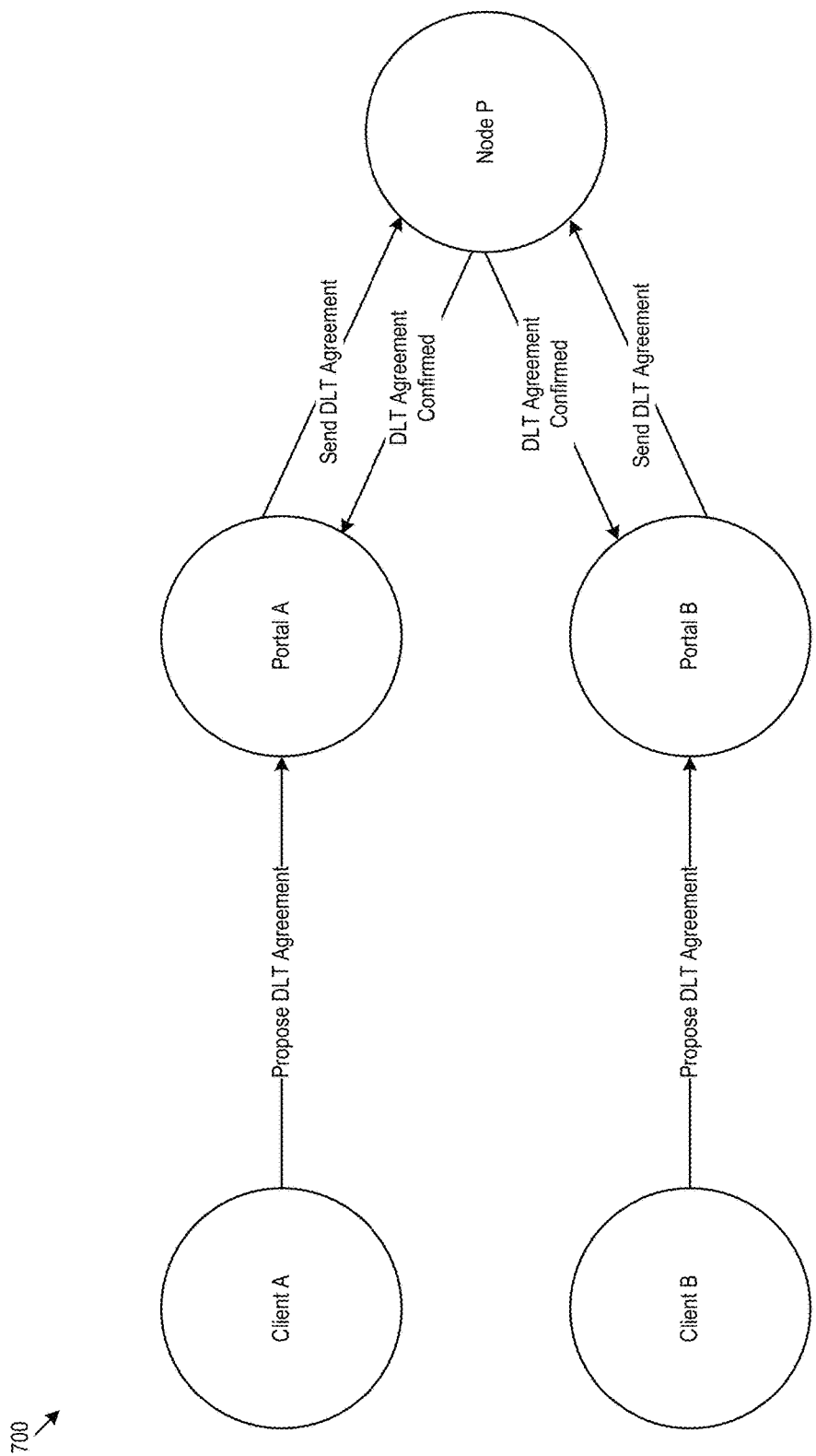
FIG. 7 shows a block diagram showing an example DLT agreement exchange.

Next, two Portals that would like to have the option to be involved in asset transfers with one another must communicate with Node P that they would like to establish a DLT Agreement, which is stored on Node P and indicates an agreement between the two Portals regarding common identifiers for the DLTs that may be involved in the interoperability process. This agreement is used because an individual Portal may be responsible for asset transfer on/off more than one DLT, and so both parties involved in the asset transfer may establish which DLTs are allowed to be used in asset and in which way those DLTs can be used. This is handled by the DLT agreement manager on Node P. FIG. 7 shows a block diagram showing an example DLT agreement exchange 700 between two clients.

Additionally, since Node P is responsible for locking the asset on one DLT and creating the asset on the other DLT, the DLT agreement also contains the credentials needed to allow Node P to interact with the individual DLTs. In the DLT agreement, two Portals (e.g., the Portal that may be the asset sender and the Portal that may be the asset receiver) are specified and information about the sender DLT and information about the receiver DLT is specified. The information that must be specified about the DLTs involved is, for each DLT, (1) the common identifier for the DLT (e.g. the identifier both parties may use when referring to this DLT in the asset transfer context) (2) the type of the DLT (e.g., Fabric, Quorum, etc.) (3) the credentials to allow Node P to interact with the DLT. Node P contains interactor files that allow for Node P to create and lock assets on Quorum, Fabric, and any other DLT for which Node P has an interactor implementation.

The process for establishing a DLT Agreement is based on the Portals sending messages to Node P and Node P issuing a message to the Portals once the agreement is established. Again, Portal A and Portal B represent two different organizations, each Portal has a client that is allowed to send requests to that Portal (the clients are named client A and client B, respectively), and Node P facilitates the interoperability process. Portal A is responsible for DLT A and Portal B is responsible for DLT B. Now, if Portal A would like to establish a DLT Agreement with Portal B about allowing the transfer of assets from DLT A to DLT B, the following steps must take place:

Client A sends a message to Portal A asking Portal A to establish a DLT Agreement with Portal B with regards to allowing DLT A to transfer assets to DLT B. Included in this message are common identifiers for DLT A and DLT B, the type of DLT for DLT A and DLT B, and the credentials to allow Node P to interact with DLT A.

Portal A receives the message from client A and sends a message to Node P stating that Portal A would like to establish a DLT agreement with Portal B with regards to allowing DLT A to transfer assets to DLT B. IP Addresses+Ports are used to uniquely identify Portals for the purpose of this agreement.

Node P receives the message from Portal A and checks to see if a Trusted Entity Agreement has already been established between Portal A and Portal B. If said agreement has not been established, an error is returned in the response. Otherwise, Node P stores the DLT Agreement between Portal A and Portal B about DLT A and DLT B as "unconfirmed". Additionally, Node P stores the common identifiers of the DLTs, the types of the DLTs, and the credentials to interact with DLT A.

The above process is repeated but with client B and Portal B sending the messages.

Once Node P receives the message from Portal B asking to establish a DLT Agreement with Portal A, given that the DLT Agreement between Portal A and Portal B is stored on Node P as "unconfirmed", a validation check is performed, and if this check passes, the state of the DLT Agreement between Portal A and Portal B that is stored on Node P is updated to be "confirmed". The validation check passes if the common identifiers and types of the DLTs stored in the unconfirmed agreement on Node P match the common identifiers and types of the DLTs in the message from Portal B to Node P.

If the state of the DLT Agreement is updated to confirmed, then Node P sends a message to both Portals stating the DLT Agreement has been established.

Two Portals are permitted to engage in asset transfer after the two Portals establish a Trusted Entity Agreement and a DLT Agreement between sender DLT A and receiver DLT B. The asset transfer process may include multiple stages that will be described below.

Figure 8:
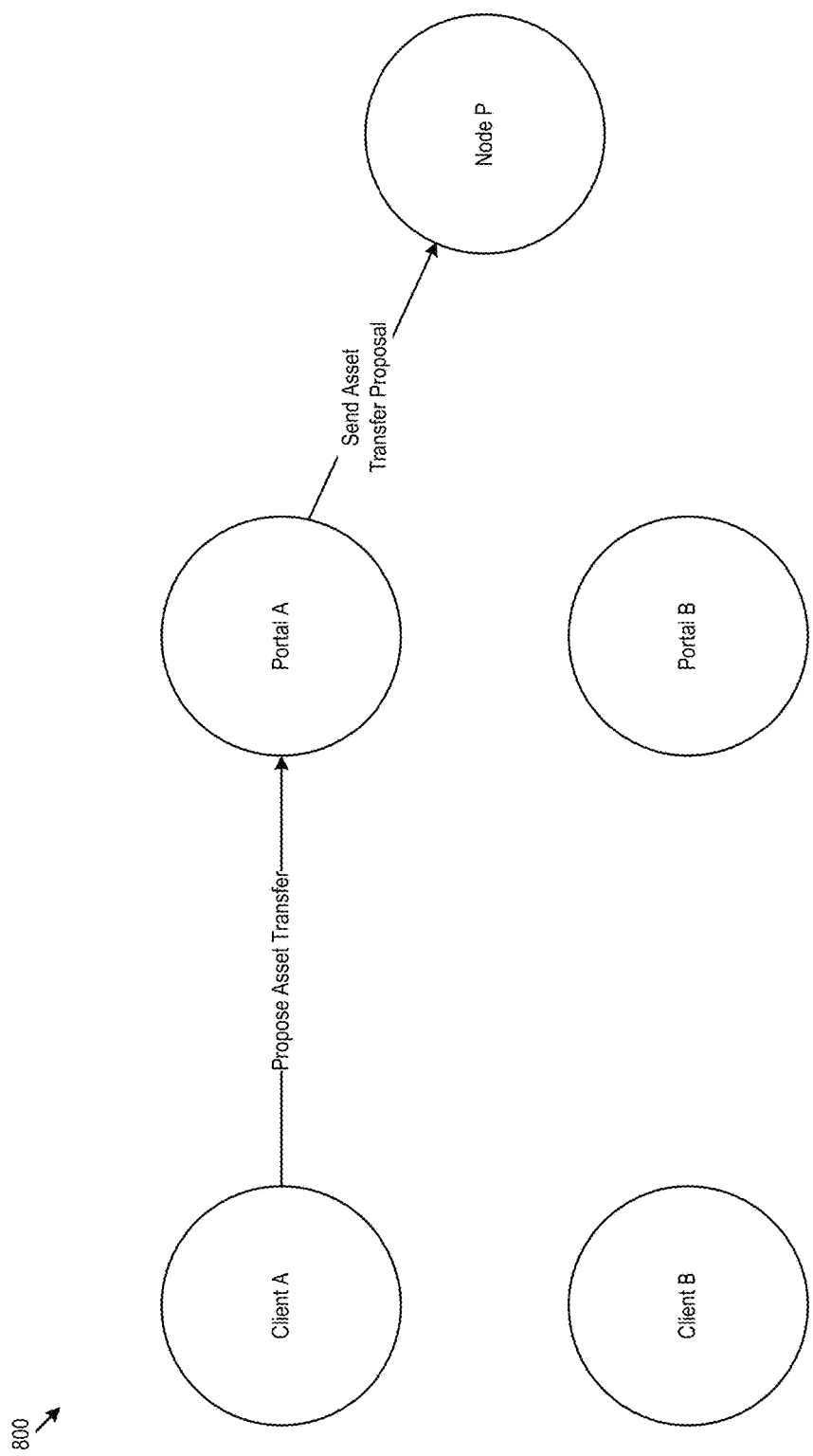
FIG. 8 shows a block diagram showing an example asset transfer proposal.

Client A sends message to Portal A asking to initiate asset transfer of asset W with Portal B from DLT A to DLT B and Portal A sends a message to Node P asking to initiate asset transfer of asset W with Portal B from DLT A to DLT B. FIG. 8 shows a block diagram showing an example asset transfer proposal 800 between two clients.

Figure 9:
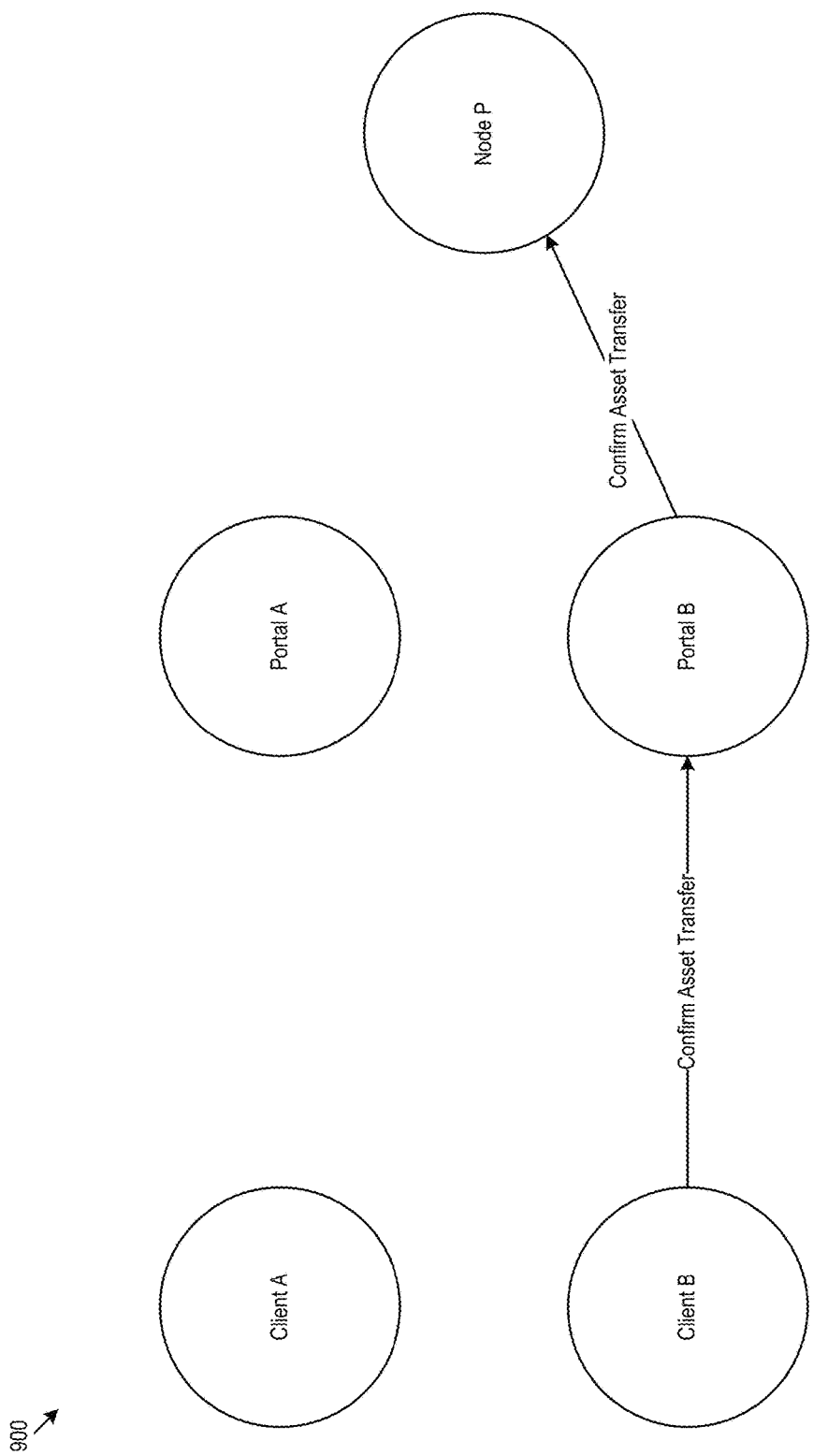
FIG. 9 shows a block diagram showing an example reply confirming a proposal.

Client B sends message to Portal B asking to initiate asset transfer of asset W with Portal A from DLT A to DLT B and Portal B sends a message to Node P asking to initiate asset transfer of asset W with Portal A from DLT A to DLT B. The messages from Portal A and Portal B can be received in either order. FIG. 9 shows a block diagram showing an example reply 900 confirming a proposal. Once Node P receives both messages, the asset transfer process is confirmed and is initiated.

Figure 10:
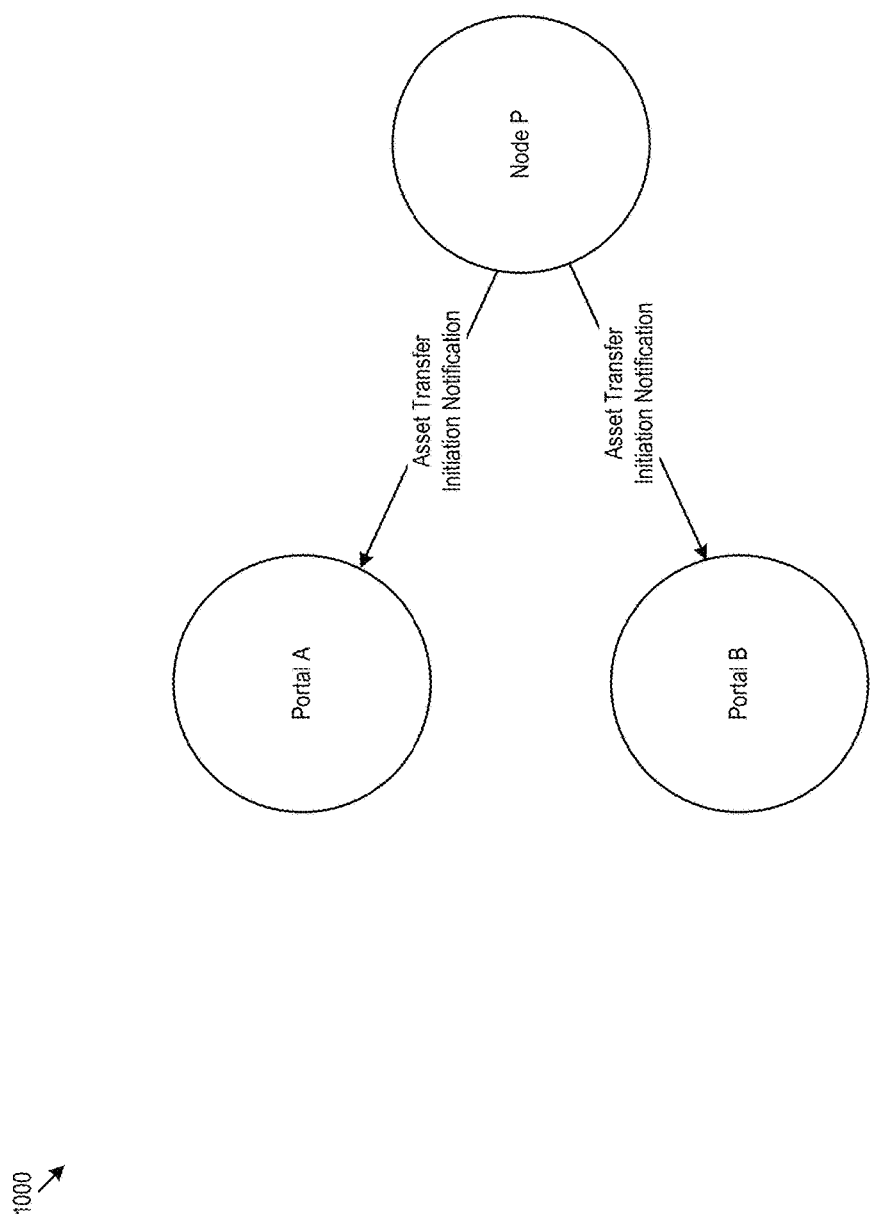
FIG. 10 shows a block diagram showing an example notification to the Portals regarding an asset transfer initiation.

Portal A and Portal B are notified that the asset transfer process has begun. FIG. 10 shows a block diagram showing an example notification 1000 to the Portals regarding an asset transfer initiation.

The manager on Node P responsible for locking the asset on the sender DLT and creating the asset on the receiver DLT needs a mechanism to interact with the individual DLTs. As described in more detail in the "Standard Asset Locking Mechanism" section, a common DLT interaction interface is implemented for each DLT type that can be handled by Node P. This interface contains functions for locking the asset and creating the asset on the smart contract (or smart contract equivalent) on the sender and receiver DLT, respectively. To retrieve the correct implementation, there is a module known as a DLT Interactor Fetcher that has a DLT type as input and returns the DLT interactor implementation, as a javascript object, as output. The DLT interactor implementation is loaded at runtime, immediately before the asset is either locked on the sender or the corresponding asset is created on the receiver.

In order to ensure that the asset is considered "transferred off" DLT A, the DLT interactor is used to move asset W into the "locked" state, (as defined by the standards set forth in the "Standard Asset Locking Mechanism"). Portal A and Portal B are notified that asset W has been locked. If an error in locking occurs, which implies locking the asset is unsuccessful, then the asset transfer process may terminate and may send an error message to both Portals.

Figure 11:
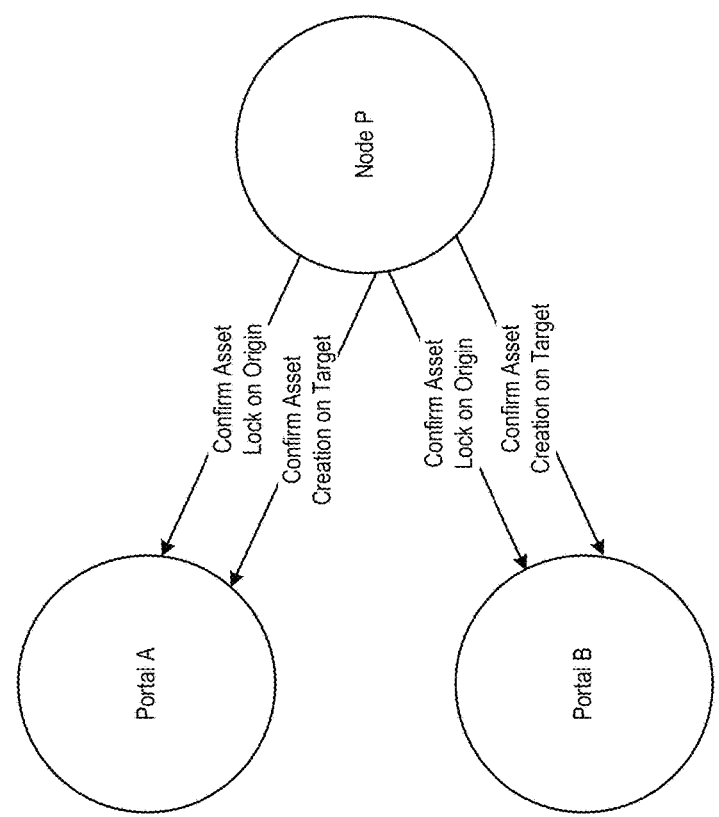
FIG. 11 shows a block diagram showing an example interaction where asset locking and creation is successful.

In order to ensure that the asset is considered "transferred onto" DLT B, the DLT interactor is used to create an asset on DLT B that stores the identifier for asset W on the origin DLT and the sender DLT identifier, as established in the DLT Agreement, on-chain with the newly-created asset. This may be achieved using the "Asset Locking Mechanism". Portal A and Portal B are notified that an asset corresponding to asset W has been created on the receiver DLT. When the phrase "Asset corresponding to asset W" is used, this refers to asset that has been created on the receiver DLT. FIG. 11 shows a block diagram showing an example interaction 1100 where asset locking and creation is successful. The created asset has an on-chain reference to the origin asset ID of W and the sender DLT ID. If an error in asset creation occurs, which implies asset creation is unsuccessful, then the asset transfer process may terminate and may send an error message to both Portals.

Node P uses the ability to write to the sender DLT and to write to the receiver DLT. If an error in locking or creating the asset occurs, then the DLT interaction stage may abort and may send an error message to both Portals.

Figure 12:
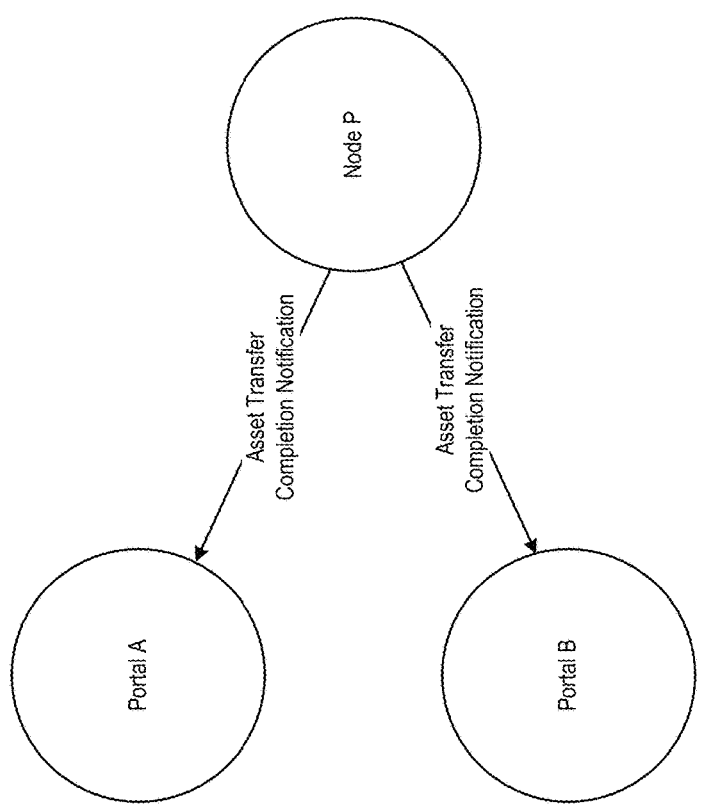
FIG. 12 shows a block diagram showing an example notification to the Portals indicating that the transfer is complete.

At the point that asset W is confirmed locked on the sender DLT and the corresponding asset is confirmed created on the receiver DLT, both Portals may be sent a message that indicates the asset transfer process is complete. FIG. 12 shows a block diagram showing an example notification 1200 to the Portals indicating that the transfer is complete.

Messages in the asset transfer process may be sent as POST requests and either receive an error or an "ok" as a response. The response to a request may indicate that the request was processed. The response may not necessarily indicate that a state change in the asset transfer process has successfully occurred. When state changes in the transfer process occur, Node P may send requests to the Portals involved with messages describing the state change and those Portals may acknowledge those requests by sending an "ok" in their response.

In the specific example interoperability solutions based on Portal™, various components may be implemented. The paragraphs below discuss implementation of example components. As a first example component, an example Interoperability Server is a module that runs an Express server and contains multiple layers of abstraction to isolate the various interactions that occur with the server, with data storage, with the asset transfer process, and with direct DLT interactions. Additionally example components are added to the server in the form of routes listed in the server base class, a Routes file for handling said routes, and a Manager class for executing the correct business logic for each of those Routes.

In order to ensure that Portals that agree to communicate and agree to some identifiers for their respective DLTs are involved in asset transfer, middleware validates the existence of these agreements.

In the specific example interoperability solutions based on Portal™, various components may be implemented. The paragraphs below discuss implementation of example components. As a first example component, Routes for establishing trusted entities may not, in some cases, require agreement validation as these Routes are how the baseline agreement is established in the first place.

All Routes for establishing common DLT identifiers require a Trusted Entity Agreement to be in place. Since the DLTs involved by the two parties are relevant for asset transfer, the parties use a common way to be able to refer to their own and to each other's DLTs. If no Trusted Entity Agreement is in place when a DLT agreement is proposed, an error may be returned by Node P to the Portal that sent the message about the DLT agreement to Node P.

All Routes for the asset transfer process require both a Trusted Entity Agreement and a DLT identifier agreement to be in place. If no Trusted Entity Agreement is in place when an asset transfer agreement is proposed, an error may be returned by Node P to the Portal that sent the message about the asset transfer agreement.

Routes files may include functions, with a function for each endpoint, that are called immediately after the respective endpoint is hit on the server. These functions all take in a request and response as arguments. Each Routes file is associated with a Manager. The associated Manager contains a function to handle at least each endpoint, and so when an endpoint is hit, the server may call the corresponding Routes function and the Routes function may call the corresponding Manager function. The Routes itself is responsible for responding to the request, and may either return an error if some problem occurred or may return an "ok" response if the request succeeded.

Referring now to another example component, the example system may implement a Storage interface that has been established to provide flexibility with regard to how data is stored on Node P. An implementation of the Storage interface uses functions on a JSON object to store, update, and retrieve data. This JSON object may be backed up using a file on disk that is updated when updates to the JSON object occurs.

The "state-holding" wrapper for a Storage object is called a Vault. A Vault allows for some key-value pair to be associated with a certain state. The Vault is designed to allow for a predefined set of possible state transitions, and attempts to transition from a state to an invalid state may result in an error being thrown (generally through a promise rejection). The entire state of the system can be observed by just looking at the current states in the available Vaults, yet another example component. A Storage object is used to keep track of states (mapping key to state) and a Storage object is used to keep track of key-value pairs (mapping key to value). All interactions with a Vault take place through the VaultManager, which represents yet another component that adds a layer of abstraction between the Vault itself and the business logic that may be interacting with the Vault. This is useful as other information and functions surrounding the Vault can be added to the VaultManager. For example, the VaultManager is responsible for the calling of Watchers, which are optional custom functions that are run on Vault updates. As with the Storage interface, the Vault interface allows for alternative implementations to be used.

Referring now to another example component, a Watcher is an function that the organization(s) running an Interoperability Server module, such as the specific example discussed above, can provide to have logic (e.g., operation or logistical rules) executed whenever state transitions on an Interoperability Server occurs. The Vault allows for an associated Watcher. Therefore, when updates are made to the vault, the Watcher may be notified and the Vault may pass all relevant information about the update to the Watcher function.

Watcher functions are passed into the Interoperability server by the party responsible for starting the server.

Most of the tests which validate the entire asset transfer process use Watchers to receive updates as to when asset transfer is considered complete, and then may query the asset on the receive chain to confirm both its existence and that the asset on the receiver chain contains the correct data (which is a reference to the origin asset ID and to the origin DLT ID).

A Manager handles the logic for a certain subset of the routes present on the example Interoperability Server. Furthermore, each Manager is associated with one or more Vaults so that the Manager can be responsible for states of certain information, such as asset transfer agreements. Manager functions that support direct interactions with routes may be designed to operate asynchronously. Within the asset transfer solution, there are Managers present for establishing Trusted Entity Agreements, establishing DLT agreements, and for performing the asset transfer process. The system may allow for interoperability between the two DLTs without introducing significant overhead. The system may ensure failures in the asset transfer process do not violate the blockchain invariants and support recovery.

Runtime tests were performed to observe the time required to transfer an asset from Quorum to Fabric and to transfer an asset from Fabric to Quorum. Additionally, the solution has been thoroughly tested for various failure modes. The failure modes, the consequences of those failure modes, and the recovery from those failures is described in detail.

In the event of some failure during the asset transfer process, a notification may be sent to the Portals involved. There are a few core categories of failures that are handled by the system: (1) DLT interaction errors (2) internal errors (3) Node P failures. In the case of a DLT interaction error or an internal error, both Portals involved in the asset transfer may receive a notification that a failure occurred. For DLT interaction errors, Node P may send a message to either the /noLockFound or /failedToCreateAssetOnReceiver endpoint on each Portal when locking the asset on the sender DLT fails or creating the asset on the receiver DLT fails, respectively. For internal errors, such as unexpected promise rejections, Node P may send a message to the /otherError endpoint on each Portal with a description of the error that occurred. When a failure of Node P occurs, as in the server itself goes offline for some reason, no messages are sent by Node P to the Portals involved. Node P, by the definition of being offline, cannot send any message indicating its status as offline.

Failure modes may have a linking element: they result in an unsuccessful asset transfer. For that reason, Node P is built to run the asset transfer process using permanent records from the DLTs as the governing record of the asset's current state in the transfer process. This becomes more apparent when looking at the individual DLT interactions that occur. When locking the asset on the sender DLT, a manager first attempts to lock the asset and then, if locking fails (which occurs when there is a DLT interaction error or when the asset has already been locked), may query the DLT to check if the asset is currently locked. Similarly, when creating the asset on the receiver DLT, a manager first attempts to create the asset and then, if creating fails (which occurs when there is a DLT interaction error when that asset has already been created), may query the DLT to check if that asset has already been created. In both cases, this "attempt then query" approach prevents the double-use issue (e.g. locking the same asset twice or creating the same asset twice) while allowing for continuation of the asset transfer process from any state. This also handles the case where two Portals ask to perform the same asset transfer multiple times. For a given asset, locking can occur once on the sender DLT. Asset creation can occur once on the receiver DLT, so two Portals can ask to perform asset transfer as many times as they wish and the blockchain invariants may be maintained (e.g. when the asset may be locked on the sender DLT at most once, and created on the receiver DLT at most once).

If a failure occurs in the asset transfer process for transferring some asset from DLT A to DLT B, the Portals must both send messages to Node P asking to initiate the asset transfer process of that asset from DLT A to DLT B again.

When Node P receives those messages, the asset transfer process may restart while taking the measures described above to maintain the blockchain invariants.

In some implementations, Portal™ relies on a trusted Node P to facilitate the asset transfer. As such, Node P being compromised could lead to a variety of bad outcomes, including multiple copies of a single asset being created, as invalid writes could occur to either blockchain (e.g. Node P could lie about an asset's origin ID).

In some cases, Portal™ uses a Node P that has both read and write access to the DLTs that it is transferring assets between. As such, Node P may be allowed both read/write access to each DLT involved. Further, for each DLT, may use an implementation of the DLT interactor interface that can read/write to the DLT. An additional or alternative approach to this is allowing Node P read access to each DLT and having the parties responsible for each DLT performing the required writes (e.g., the transaction for locking the asset and the transaction for creating the asset). Thus, the individual parties would lock/create assets on their respective DLTs, and Node P would verify the lock/create did successfully occur. This bounds the damage that could be done if an adversary were to take control of Node P since the integrity of the DLT could be compromised if Node P has write access. States may be stored as javascript object notation (JSON) objects. The Node P may be scaled horizontally. Also, the system may implement a Storage implementation that is backed by a NoSQL database locally or in the cloud, which would effectively provide as much secure storage as needed to handle any and all data that is stored on Node P. In order for Node P to scale to handle more DLT types, Node P (1) may have DLT interactors for each DLT type and (2) needs to be given credentials for each DLT that is involved in some DLT agreement stored on Node P.

If Node P is running on local nodes of the sender and receiver DLT, then nodes other than Node P may be untrusted. If Node P communicates with remote nodes of the sender and receiver DLT, then Node P and those nodes may be trusted.

Assets may be defined within the smart contract/chaincode system. These assets may store states for asset locking and asset creation in the contract/chaincode that Portal™ expects to be interacting with. The system may be implemented such that assets do not need to be defined within the Portal™ system. Effectively, this allows Portal™ to be used with assets that are currently on a Quorum or Fabric DLT.

A registry contract to the DLT may be used in place of chaincode state definitions. Within this contract, any asset may be marked as locked before transfer. As such, the DLT interactors need to be changed some small amount to query the correct contracts for the correct data. This effectively allows Portal to be used on assets already created on some existing contract/chaincode. In some cases, the Node P uses a DLT interactor interface to call the implementations of these functions on the DLT interactors.

The system may implement message/transaction encryption and access control, e.g., permissions systems for the creation and participation as a Portal and/or Node.

A change in DLT system 1 that is relevant to DLT 2 system, passes control to Interoperability node to facilitate the appropriate data element creation or update on DLT system 2 and locks the data element in DLT system.

The Node P has access to the transactions related to the asset to transfer (as an example, in Fabric, node P may be part of the channel that contains the asset, in Quorum it may be a party of the private transaction).

The performance metrics discussed in U.S. Provisional Patent Application Ser. No. 62/769,343, filed 19 Nov. 2018, previously incorporated by reference herein, indicate that the interoperability techniques and architectures allow interactions by systems at rates similar to serial transactions on the disparate systems. Accordingly, the asset locking and transfer techniques and architectures improve the operation of the underlying hardware by allowing interoperation of the disparate systems and by allowing such interoperation to occur on time scale similar to those by which the transfer could be completed on each system without interoperation. Therefore, the techniques and architectures provide improvement over existing market solutions by providing increased speed and interoperability to the underlying hardware.

In some cases, the systems, e.g., the portals, clients, or node P may be implemented on a localized or distributed execution platform. The platform may include system circuitry, which may include one or more processors and memory. The memory may include template, execution instructions, applications, data structures, or other content to support execution of the various systems above.

Alternatively or additionally, the node P may be supplanted by an intermediate federated Node P system. The federated Node P system may act as a distributed trusted intermediary. The federated Node P may log transactions using individual nodes each with low trust levels. However, through consensus double-expend and sequencing guarantees may be upheld. Further, a blockchain may be used to secure historical transaction records preventing later tamper. The federated Node P may incentivize action by nodes as intermediaries by providing access to a reward token, such as a right of issuance of a coin, interest in a percentage or other portion of the assets subject to the transfer, or other remuneration. In some cases, the federated Node P system may instruct nodes to leave transaction markers on the fabrics receiving and sending the asset subject to transfer. The markers may be used as tracking elements for the federated Node P system.

Various implementations may use the techniques and architectures described above.

A1 In an example, a system includes: an origin memory storing an origin blockchain compliant with an origin distributed ledger technology; a target memory storing a target blockchain compliant with a target distributed ledger technology; and interop circuitry configured to: receive from origin participant circuitry associated with the origin blockchain an origin asset permission to transfer an asset tracked on the origin blockchain to the target blockchain; send a request to target participant circuitry associated with the target blockchain to instantiate the asset on the target blockchain; responsive to the request, receive a target asset permission to instantiate the asset on the target blockchain; using the origin asset permission, lock the asset on the origin blockchain; and using the target asset permission, instantiate the asset on the target blockchain.

A2 The system of example A1, where the interop circuitry is further configured to: receive an origin write permission for the origin blockchain; and receive a target write permission for the target blockchain.

A3 The system of example A2, where the interop circuitry is configured to operate as an interoperability node between the origin and target blockchains using the origin and target write permissions.

A4 The system of example A3, where the interop circuitry is further configured to obtain origin security credentials to establish an identity of the interop circuitry on the origin blockchain when using the origin write permission, the origin asset permission, or both.

A5 The system of either of examples A3 or A4, where the interop circuitry is further configured to obtain target security credentials to establish an identity of the interop circuitry on the target blockchain when using the target write permission, the target asset permission, or both.

A6 The system of any of examples A3-A5, where the interop circuitry is configured to implement a two-tiered exchange including: an establishment tier in which the origin and target write permissions are exchanged; and an transfer tier configured to execute after the establishment tier and in which the origin and target asset permissions are exchanged.

A7 The system of any of examples A1-A6, where the interop circuitry is configured to receive the origin and target asset permissions to facilitate an asset permission exchange ahead of transfer of the asset from the origin blockchain to the target blockchain.

A8 The system of example A7, where the origin and target asset permissions are configured to identify a participating node designated to receive a notice regarding transfer of the asset.

A9 The system of any of examples A1-A8, where the target asset permission identifies the asset and the origin distributed ledger technology.

A10 The system of any of examples A1-A9, where the interop circuitry is configured to lock the asset on the origin blockchain by: generating by appending a string to the asset; and hashing the combination of the asset and the string.

A11 The system of example A10, where the string is configured to indicate a lock state of the asset on the origin blockchain.

A12 The system of any of examples A1-A11, where the interop circuitry is configured to instantiate the asset on the target blockchain by: generating by appending a string to the asset; and hashing the combination of the asset and the string.

A13 The system of example A12, where the string is configured to indicate that the asset was transferred from the origin blockchain.

A14 The system of either of examples A12 or A13, where content of the string is detailed within the target asset permission.

B1 In an example, a method includes: at interop circuitry: receiving from origin participant circuitry associated with a origin blockchain an origin asset permission to transfer an asset tracked on the origin blockchain to a target blockchain, the origin blockchain stored on an origin memory and compliant with an origin distributed ledger technology; sending a request to target participant circuitry associated with the target blockchain to instantiate the asset on the target blockchain, the target blockchain stored on a target memory and compliant with a target distributed ledger technology; responsive to the request, receiving a target asset permission to instantiate the asset on the target blockchain; using the origin asset permission, locking the asset on the origin blockchain; and using the target asset permission, instantiating the asset on the target blockchain.

B2 The method of example B1, further comprising: receiving an origin write permission for the origin blockchain; and receiving a target write permission for the target blockchain; and where the interop circuitry operates as an interoperability node between the origin and target blockchains using the origin and target write permissions.

B3 The method of example B2, further comprising implementing a two-tiered exchange including: an establishment tier in which the origin and target write permissions are exchanged; and an transfer tier configured to execute after the establishment tier and in which the origin and target asset permissions are exchanged.

C1 In an example, a product includes: machine-readable media other than a transitory signal; and instructions stored on the machine-readable media, the instructions configured to, when executed, cause a machine to: at interop circuitry: receive from origin participant circuitry associated with a origin blockchain an origin asset permission to transfer an asset tracked on the origin blockchain to a target blockchain, the origin blockchain stored on an origin memory and compliant with an origin distributed ledger technology; send a request to target participant circuitry associated with the target blockchain to instantiate the asset on the target blockchain, the target blockchain stored on a target memory and compliant with a target distributed ledger technology; responsive to the request, receive a target asset permission to instantiate the asset on the target blockchain; using the origin asset permission, lock the asset on the origin blockchain; and using the target asset permission, instantiate the asset on the target blockchain.

C2 The product of example C1, where the instructions are configured to cause the machine to lock the asset on the origin blockchain by: generating by appending a string to the asset; and hashing the combination of the asset and the string.

C3 The product of example C2, where the string is configured to indicate a lock state of the asset on the origin blockchain.

D1 A method implemented by operation of a system of any of examples A1-A14.

E1 A product comprising instructions stored on a machine readable medium, the instructions configured to cause a machine to implement the method of example D1.

Various implementations have been specifically described. However, many other implementations are also possible.

What is claimed is:
1. A system including:
an origin memory storing an origin blockchain,
  the origin blockchain compliant with an origin distributed ledger technology;
a target memory storing a target blockchain,
  the target blockchain compliant with a target distributed ledger technology; and
interop circuitry configured to:
  implement a multiple-tier exchange by:
    within an establishment tier of the multiple-tier exchange:
      receiving an origin write permission for the origin blockchain; and
      receiving a target write permission for the target blockchain
    within a transfer tier of the multiple-tier exchange, the transfer tier configured to execute after the establishment tier:
      receiving from origin participant circuitry associated with the origin blockchain an origin asset permission,
        the origin asset permission to allow transfer of an asset tracked on the origin blockchain to the target blockchain;
      sending a request to target participant circuitry associated with the target blockchain to instantiate the asset on the target blockchain; and responsive to the request, receiving a target asset permission to instantiate the asset on the target blockchain, the target asset permission configured to allow instantiation of the asset on the target blockchain; and operate as an interoperability node between the origin and target blockchains by:
using the origin asset permission, locking the asset on the origin blockchain; and
using the target asset permission, instantiating the asset on the target blockchain.

2. The system of claim 1, where the interop circuitry is further configured to obtain an origin security credential, the origin security credential configured to establish an identity of the interop circuitry on the origin blockchain when using the origin write permission, the origin asset permission, or both.

3. The system of claim 1, where the interop circuitry is further configured to obtain target security credentials to establish an identity of the interop circuitry on the target blockchain when using the target write permission, the target asset permission, or both.

4. The system of claim 1, where the interop circuitry is configured to receive the origin and target asset permissions to facilitate an asset permission exchange ahead of transfer of the asset from the origin blockchain to the target blockchain.

5. The system of claim 4, where the origin and target asset permissions are configured to identify a participating node designated to receive a notice regarding transfer of the asset.

6. The system of claim 1, where the target asset permission identifies the asset and the origin distributed ledger technology.

7. The system of claim 1, where the interop circuitry is configured to lock the asset on the origin blockchain by:
generating by appending a string to the asset; and
hashing the combination of the asset and the string.

8. The system of claim 7, where the string is configured to indicate a lock state of the asset on the origin blockchain.

9. The system of claim 1, where the interop circuitry is configured to instantiate the asset on the target blockchain by:
generating by appending a string to the asset; and
hashing the combination of the asset and the string.

10. The system of claim 9, where the string is configured to indicate that the asset was transferred from the origin blockchain.

11. The system of claim 9, where content of the string is detailed within the target asset permission.

12. A method including:
at interop circuitry:
implementing a multiple-tier exchange by:
within an establishment tier of the multiple-tier exchange:
receiving an origin write permission for an origin blockchain; and
receiving a target write permission for a target blockchain
within a transfer tier of the multiple-tier exchange, the transfer tier executing after the establishment tier:
receiving from origin participant circuitry associated with the origin blockchain an origin asset permission to transfer an asset tracked on the origin blockchain to the target blockchain, the origin blockchain stored on an origin memory and compliant with an origin distributed ledger technology;
sending a request to target participant circuitry associated with the target blockchain to instantiate the asset on the target blockchain, the target blockchain stored on a target memory and compliant with a target distributed ledger technology; and
responsive to the request, receiving a target asset permission to instantiate the asset on the target blockchain; and
operating as an interoperability node between the origin and target blockchains by:
using the origin asset permission, locking the asset on the origin blockchain; and
using the target asset permission, instantiating the asset on the target blockchain.

13. The method of claim 12, where receiving the origin and target asset permissions comprises facilitating an asset permission exchange ahead of transfer of the asset from the origin blockchain to the target blockchain.

14. The method of claim 13, where the origin and target asset permissions identify a participating node designated to receive a notice regarding transfer of the asset.

15. The method of claim 12, where the target asset permission identifies the asset and the origin distributed ledger technology.

16. The method of claim 12, where locking the asset on the origin blockchain comprises:
generating by appending a string to the asset; and
hashing the combination of the asset and the string.

17. A product including:
machine-readable media other than a transitory signal; and
instructions stored on the machine-readable media, the instructions configured to, when executed, cause a machine to:
at interop circuitry:
implement a multiple-tier exchange by:
within an establishment tier of the multiple-tier exchange:
receiving an origin write permission for an origin blockchain; and
receiving a target write permission for a target blockchain
within a transfer tier of the multiple-tier exchange, the transfer tier configured to execute after the establishment tier:
receiving from origin participant circuitry associated with the origin blockchain an origin asset permission to transfer an asset tracked on the origin blockchain to the target blockchain, the origin blockchain stored on an origin memory and compliant with an origin distributed ledger technology;
sending a request to target participant circuitry associated with the target blockchain to instantiate the asset on the target blockchain, the target blockchain stored on a target memory and compliant with a target distributed ledger technology; and
responsive to the request, receiving a target asset permission to instantiate the asset on the target blockchain; and
operate as an interoperability node between the origin and target blockchains by:
using the origin asset permission, locking the asset on the origin blockchain; and
using the target asset permission, instantiating the asset on the target blockchain.

18. The product of claim 17, where the instructions are configured to cause the machine to lock the asset on the origin blockchain by:
generating by appending a string to the asset; and
hashing the combination of the asset and the string.

19. The product of claim 18, where the string is configured to indicate a lock state of the asset on the origin blockchain.

20. The product of claim 18, where content of the string is detailed within the target asset permission.

* * * * *